Patented Aug. 11, 1953

2,648,603

UNITED STATES PATENT OFFICE 2,648,603

SURFACING COMPOSITION AND METHOD

Peter Jenin and Nicholas R. Jenin,
Blue Island, Ill.

No Drawing. Application June 30, 1949,
Serial No. 102,426

5 Claims. (Cl. 94—19)

This invention relates to a novel surfacing composition, particularly adapted and suitable for automobile race tracks, and likewise suitable for surfaces on which other sporting events or games are conducted and played, such as for tennis courts, baseball diamonds, and the like, and to the method of making such surfaces.

It is an object of the present invention to provide hard and fast surfaces suitable for the indicated uses, composed principally of clay, and which are not slippery when wet but, on the contrary, are at all times of a tractive nature; which readily absorb and retain water or moisture; which do not readily crack or disintegrate; which are essentially of a dust-free nature and which can readily be swept; and which can quickly and easily be repaired and dressed as the occasion or usage may require.

The composition of our invention is composed of at least 50% by volume of clay, together with granules of porous absorbent stable material such as granular brick, and a diliquescent material such as calcium chloride.

The clay may be blue clay or yellow clay. Blue clay is however preferred because of its greater density, having an average weight on a dry basis of about 137 pounds per cubic foot. Common yellow clay has an average weight on a dry basis of about 63 pounds per cubic foot. The clay is employed in dry ground or pulverized condition and should not contain more than 5% of impurities, such as stone, wood, rubbish, etc.

As the diliquescent material, we preferably employ calcium chloride. A suitable commercial material is one sold in dry flake form, and which has a 77–80% $CaCl_2$ content on an anhydrous basis, and which may contain about 3% impurities. This material weighs about 60 pounds per cubic foot, and is employed in the proportion of from about 0.5% to about 1.5% by volume of the mixture.

For the absorbent porous material, we prefer crushed granular brick particles of a character such that 100% will pass a ¼ inch mesh screen, not more than 15% will be retained on a $\frac{5}{32}$ inch mesh screen, and not more than 30% will pass a 14 mesh screen. That is to say, the brick particles should not be too large and also should not contain too much dust, but rather should be of a "granular" nature. We preferably employ common hard brick which has an average weight of about 125 pounds per cubic foot. We may in the alternative employ other crushed brick such as fire brick, or pressed brick which have a weight of about 150 pounds per cubic foot, or soft brick having an average weight of about 100 pounds per cubic foot. In the crushed granular condition as employed by us, these materials have a weight per cubic foot of about two-thirds that of the uncrushed brick, and hence greater volume. Thus, for example, the common hard brick in our granular form weighs about 83 pounds per cubic foot. Crushed or granular materials, such as granite, slag or limestone or sand, are not satisfactory for the practice of our invention since they will not adequately absorb water as well as a material such as granular brick, which absorbs and holds it in a sponge-like manner.

The proportions which we employ of the foregoing materials will vary according to the proposed use, the materials being proportioned by volume. The granular brick makes up the balance of the mixture and should be present in at least about 10% by volume of the dry materials.

For relatively small installations such as tennis courts or the like game courts, we employ a relatively large proportion of granular brick, such as from about 30% to about 45% by volume, and for such purposes we may first prepare a dry mix of the clay, brick and calcium chloride before installation thereof. For installations such as automobile race tracks, we preferably employ a relatively smaller proportion of the granular brick, such as from about 10% to about 20% by volume. For such installations, we may separately lay the three components and mix them in place, since such practice is often more feasible and economical. A typical composition for a "midget" auto race track is the following:

|  | Parts By Volume | Percent By Volume |
|---|---|---|
| 5 tons calcium chloride | 5 | .65 |
| 150 tons granular common hard brick | 108 | 14.00 |
| 1,500 tons powdered blue clay | 657 | 85.35 |
|  | 770 | 100.00 |

In installing a "midget" automobile race track of relatively flat surface and having an incline of not more than 10 degrees, a clay thickness of not more than 8 inches is adequate. If the incline is greater, a greater thickness of clay is required to compensate for undesirable water drainage. The road should first be provided with a good stone or slag bed. After the clay, in dry ground or pulverized condition is laid down and distributed, the granular brick is placed on top of it and thoroughly scarified and mixed into the clay and the surface is then graded to its desired general form and contour for the purpose intended. The calcium chloride is then applied and the whole again thoroughly scarified and mixed to the full depth of the bed, and again contoured.

We then thoroughly dampen the installation with water and knead or masticate the surface by such means as, for example, passing heavy trucks or other traffic over it to reduce it to a "mud-like" form and to homogenize the mix and to amalgamate and bind its components together, and to thoroughly distribute its moisture content.

When laying smaller installations, such as tennis courts, the prepared mix is laid down at once, distributed and graded and wet in the same manner. Here the wetted mixture may be worked for the same purpose by such means as a hoe.

After kneading, the mix is leveled out with a motor grader on large installations, or with a blade or rake on smaller ones, and the installation is permitted to temper or cure and partially dry out for about twenty-four hours. Just before it is completely dry, but shows some dry surface spots, and does not stick to a roller, the new surface is rolled with a heavy roller, for example, a ten-ton roller.

After rolling, some moisture will appear on the surface, and at this time a grader is employed to cut off high spots and followed by a float or drag to fill in low spots and then rolled. This may be repeated until a surface of desired smoothness is obtained, after which it is ready for use.

Although clay alone would provide a good hard surface, it rapidly dries out and falls apart.

The granular brick acts as a binder for the clay to prevent its cracking and falling apart, and additionally provides the mix with porous cells for absorbing and holding water to keep the clay moist, clay itself being non-water absorbent and substantially water-proof.

Although the use of calcium chloride dusting on road surfaces is known for the purpose of keeping down dust, it depends on humidity conditions for absorption of moisture to act in the indicated manner, and if, for example, it were applied to a surface made solely of clay, it would make such surface too slippery, and since clay is non-porous it could not draw water into the clay, and any water applied to the surface would run off.

In accordance with our composition and method, where the calcium chloride is mixed with the clay and granular brick, the water added thereto will have a tendency to be retained within the interior of the applied thickness, and the calcium chloride will not have to depend on atmospheric humidity or rains. Further, our laid composition can be sprinkled with a hose and water will penetrate down through the surface and the absorptive brick particles together with the calcium chloride has a strong tendency to hold and retain moisture within the bed and thus prevent the clay from drying out, particularly beneath the upper exposed surface, say from one inch down.

Our original composition is permanent, except for its calcium chloride content which requires renewal each year since its effectiveness is lost over the spring and summer period by solution or washing out. Renewal of the internal calcium chloride content the following year again places the bed in good condition.

For a good racing surface, it will be found desirable before the weekly racing period to apply a light surface of calcium chloride and then sprinkle with water to compensate for limited surface drying which may occur to a depth of about one inch. In this instance, the calcium chloride draws moisture from the bed upwardly and does not have to depend on high humidity or atmospheric moisture to provide a dust-free fast surface, and the effect is to equalize surface moisture when it becomes too dry, due to low humidity, and to thus equalize the moisture content of the bed.

On smaller installations such as tennis courts, baseball diamonds, and the like, which can be covered up when not in use, periodic surface dusting with additional calcium chloride is not necessary.

The original calcium chloride content of the mix will vary with the time of installation and the humidity conditions of the place of installation, and we find that the best time to make the installation is in the spring.

We claim as our invention:

1. A surfacing composition comprising an intimate mixture of at least 50% by volume of clay, from at least 10% to about 45% by volume of porous, absorbent, stable, granular material of a particle size such that 100% passes a ¼-inch mesh screen, and a relatively small amount of diliquescent material.

2. A surfacing composition composed of an intimate mixture of at least 50% by volume of clay, from about 0.5% to about 1.5% by volume of calcium chloride, and from at least 10% to about 45% by volume of brick granules, said brick granules being of a particle size such that 100% passes a ¼-inch mesh screen, not more than about 15% is retained on a $\frac{5}{32}$ inch mesh screen, and not more than about 30% passes a 14 mesh screen.

3. A surface comprising by volume in the dry condition a mixture of at least 50% by volume of clay, from about 0.5% to about 1.5% calcium chloride and from at least 10% to about 45% of brick granules of a particle size such that 100% passes a ¼-inch mesh screen, the whole being in an intimately admixed, moist and compact condition, the granular brick acting as a binder for the clay to prevent its cracking and falling apart and additionally providing the mix with porous cells for absorbing and holding water to keep the clay moist.

4. The method of forming surfaces of the class described, which comprises spreading onto a bed an intimate mixture composed of from at least 10% to about 45% by volume of brick granules of a particle size such that 100% passes a ¼-inch mesh screen, from about 0.5% to about 1.5% by volume of calcium chloride and at least 50% by volume of clay, thoroughly wetting the mixture with water and masticating it to a mud-like consistency to homogenize the mix and to intimately distribute the moisture throughout, leveling out the mix and permitting it to temper and dry until it exhibits partial surface drying, and then subjecting it to grading and rolling to level out and compact and densify the composition.

5. The method of forming a roadway suitable for automobile racing, which comprises spreading onto a firm supporting bed an intimate mixture composed of from about 10% to about 20% by volume of crushed brick granules of a particle size such that 100% passes a ¼-inch mesh screen, from about 0.5% to about 1.5% by volume of calcium chloride and the balance clay, by first spreading out said clay and then sequentially spreading thereover and intimately mixing therewith said brick granules and said diliquescent material, thoroughly wetting the mixture with water and masticating it to a mud-like consistency to homogenize the mix and to intimately distribute the moisture throughout, leveling out the mix and permitting it to temper and dry until it exhibits partial surface drying, and then subjecting it to grading and rolling to level out and compact and densify the composition.

PETER JENIN.
NICHOLAS R. JENIN.

References Cited in the file of this patent

UNITED STATES PATENTS

| Number | Name | Date |
|---|---|---|
| 1,140,241 | Birkinshaw et al. | May 18, 1915 |

FOREIGN PATENTS

| Number | Country | Date |
|---|---|---|
| 217,471 | Great Britain | June 19, 1924 |

OTHER REFERENCES

American City, October 1934, page 44.
Engineering News-Record, January 13, 1944, page 92.
Public Roads, volume 24, No. 2, Oct.-Nov.-Dec. 1944, page 37.